(12) United States Patent
Kaji (10) Patent No.: US 6,501,468 B1
(45) Date of Patent: Dec. 31, 2002

(54) STEREOSCOPIC DISPLAY DEVICE AND RECORDING MEDIA RECORDED PROGRAM FOR IMAGE PROCESSING OF THE DISPLAY DEVICE

(75) Inventor: Yoshiyuki Kaji, Tokyo (JP)

(73) Assignee: Sega Enterprises, Ltd., Tokyo (JP)

( * ) Notice: Subject to any disclaimer, the term of this patent is extended or adjusted under 35 U.S.C. 154(b) by 0 days.

(21) Appl. No.: 09/105,154

(22) Filed: Jun. 26, 1998

(30) Foreign Application Priority Data

Jul. 2, 1997 (JP) .............................................. 9-177330

(51) Int. Cl.[7] .............................................. G06T 15/00
(52) U.S. Cl. ................... 345/419; 345/7; 345/8
(58) Field of Search ................ 345/419, 7, 8; 382/154

(56) References Cited

U.S. PATENT DOCUMENTS

| 5,844,530 A | * 12/1998 | Tosaki ............................ 345/8 |
| 5,953,054 A | * 9/1999 | Mercier ....................... 382/154 |
| 5,963,664 A | * 10/1999 | Kumar et al. ................ 382/154 |

FOREIGN PATENT DOCUMENTS

JP          6-59108      8/1994
JP          7-104212     4/1995

* cited by examiner

Primary Examiner—Mark Zimmerman
Assistant Examiner—Kimbinh T. Nguyen
(74) Attorney, Agent, or Firm—Dickstein Shapiro Morin & Oshinsky LLP

(57) ABSTRACT

A stereoscopic display device in accordance with the present invention utilizes a display screen for displaying images for right and left eyes. The display device comprises: a drawing circuit which generates image data for the right and left eyes according to view point data including view point position and light of sight directions, and object data to be displayed; and image processing unit which determines an attention target object from the plurality of objects to be displayed according at least to the shortness of the distance from the view point position to the object position, modifies the line of sight directions for the images for the right and left eyes according at least to the distance of the attention target object, and provides view point data and object data to the drawing circuit, where the drawing circuit performs perspective conversion based on the modified line of sight directions. If the attention target object comes closer, the line of sight directions corresponding to the right and left screens are modified according to the distance between the object and view point position, and perspective conversion is performed based on the modified line of sight directions, therefore images displayed on the display screen can conform to natural human perception.

9 Claims, 6 Drawing Sheets

FIG. 1

1 Head Mount Display

FIG. 2

Object A
- Attention degree : 0.5
- Position coordinate in world coordinate (Ax, Ay, Az)
- Polygon 1
- Polygon 2
- Polygon 3
- Polygon 4

Object B
- Attention degree : 1.0
- Position coordinate in world coordinate (Bx, By, Bz)
- Polygon 1
- Polygon 2

Object C
- Attention degree : 0
- Position coordinate in world coordinate (Cx, Cy, Cz)
- Polygon 1
- Polygon 2

View point data
- View point position
- Line of sight direction
- Viewing angle

STEREOSCOPIC DISPLAY DEVICE AND RECORDING MEDIA RECORDED PROGRAM FOR IMAGE PROCESSING OF THE DISPLAY DEVICE

BACKGROUND OF THE INVENTION

1. Field of the Invention

The present invention relates to a display device utilizing a head mount display or another stereoscopic display device which generates stereoscopic images by computer graphics utilizing parallax of both eyes of a human being, and a recording media where a program for executing the image processing is recorded.

2. Description of the Related Art

A purpose of computer graphics is providing actual sensations to a user, as if being in the scene, and for ordinary display screens, which are two-dimensional planes, various means are used to represent in the two-dimensional plane an object in a three-dimensional space which actually exists. A head mount display, in particular, intends to give sensations to the user, just like looking at the external world with his/her own eyes by such a display as a liquid crystal display, mounted directly before both eyes of the user.

Figure 6:
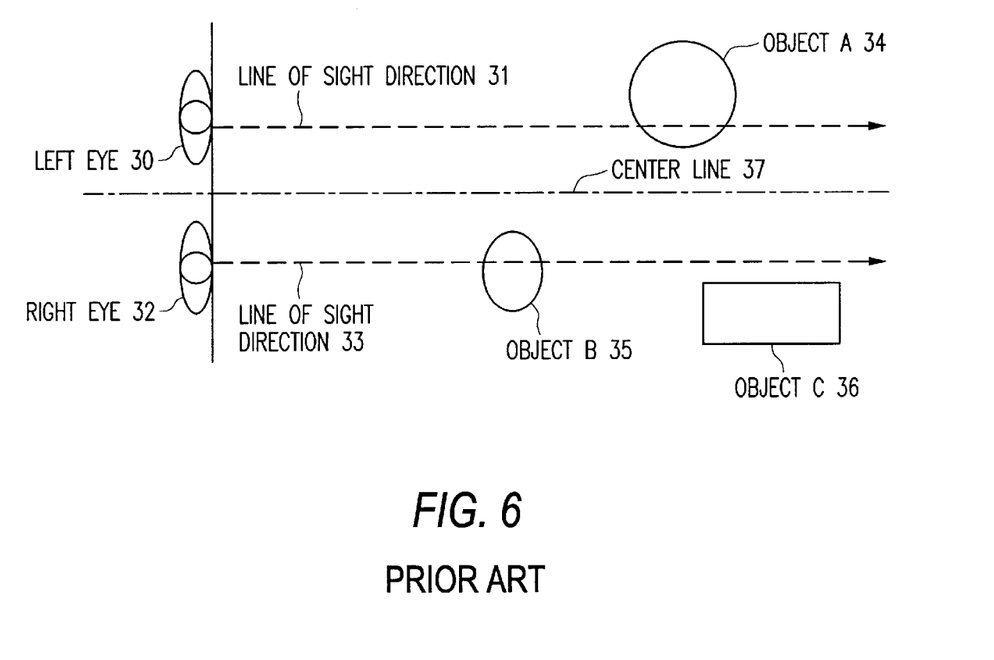
FIG. 6 is a diagram depicting an image of a conventional head mount display.

FIG. 6 shows a schematic diagram depicting the status where a user is looking at images created by computer graphics, on a head mount display. Computer graphics are created based on the view point of the user, indicated by the left eye 30 and the right eye 32 of the user. In the example of FIG. 6, objects A34, B35 and C36 exist in a virtual three-dimensional space of computer graphics. The computer graphic images are created for the left and right eyes, by converting an object in three-dimensional space to perspective views on the two-dimensional planes of the left and right display screens respectively, where view points are positions of the left eye 30 and the right eye 32 respectively, and the lines of sight direction from the right and left view points are the direction toward a point at infinity. Then the user will see three-dimensional stereoscopic images on the head mount display utilizing parallax caused by different view point positions of the left and right eyes 30 and 32.

SUMMARY OF THE INVENTION

When three-dimensional stereoscopic images are created by computer graphics and are viewed by a head mount display utilizing parallax of both eyes, as described above, images when an object is approaching the user are sometimes seen as unnatural. This is because when human eyes see an object at close range, the lines of sight move inward according to the distance of the object, but with computer graphics, perspective conversion is performed by fixing the line of sight to a point at infinity, regardless the distance from the human eyes to the attention target object.

Therefore an object of the present invention is to provide a head mount display or another stereoscopic display device that generates natural images, similar to images as a human being actually sees as a moving object, when stereoscopic images created by computer graphics utilizing parallax of both eyes are seen, and a method for generating computer graphic images.

The above objective can be achieved by a display device in accordance with the present invention which utilizes a display screen which displays images for right and left eyes, and comprises: a drawing circuit which generates image data for the right and left eyes by perspective conversion processing according to object data to be displayed and to view point data including view point position and light of sight directions; and image processing unit which determines an attention target object from the plurality of objects to be displayed according to the distance from the view point position to the object position, modifies the line of sight directions for the images for the right and left eyes according to the distance from said view point to the attention target object, and provides view point data including the modified line of sight directions and object data to the drawing circuit.

If the attention target object comes closer, the line of sight directions corresponding to the left and right screens are modified according to the distance between the object and view point position, and perspective conversion is performed based on the modified line of sight directions, therefore images displayed on the head mount display or another stereoscopic display can conform to natural human perception.

The above object can also be achieved by providing a computer-readable recording medium recording a program for generating a view point data and an object data, for a stereoscopic display device including: a display screen which displays images for right and left eyes, and a drawing circuit that generates image data for said right and left eyes by perspective conversion processing according to the view point data including a view point position and line of sight directions, and the object data to be displayed, said program executing image processing procedure of:

determining an attention target object from said plurality of objects to be displayed according to the distance from said view point position to said object position, modifying the line of sight directions for said images for the right and left eyes according to said distance, and inputting said view point data and the object data to the drawing circuit.

As a consequence, an object the human being will pay attention to can be forecasted according at least to the distance between the object and the view point direction, and a realistic stereoscopic image can be displayed by changing the line of sight directions dynamically to the direction of the object.

The above stereoscopic display can be applied to not only a head mount display device and also another stereoscopic display device, in which an image for right eye and an image for left eye are displayed frame by frame alternately, and right and left shutters provided between the display and right and left eyes are closed or opened alternately in sync with the images. Further, there has been proposed a stereoscopic display device which includes a lenticular lens or parallax barrier between the display and human beings so that human beings does not necessary to wear any eye glasses or head mount display. This type stereoscopic display device can also employ the present invention.

BRIEF DESCRIPTION OF THE DRAWINGS

FIG. 5 is a block diagram depicting another stereoscopic display device that the present invention is applied to.

DESCRIPTION OF THE PREFERRED EMBODIMENTS

Referring to the drawings, the preferred embodiments of the present invention are now described. The preferred embodiments described here, however, do not restrict the scope of the invention.

Figure 1:
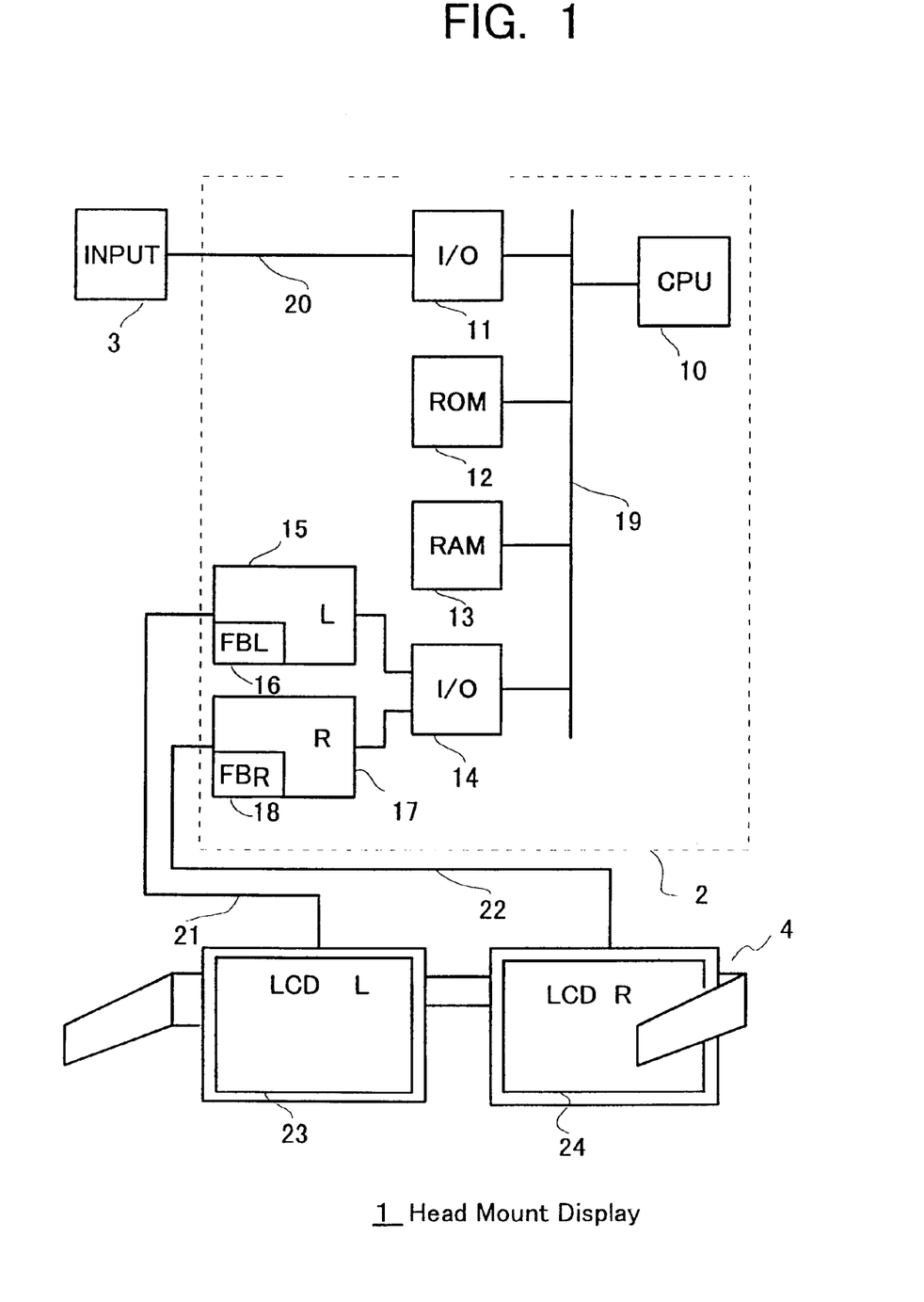
FIG. 1 is a block diagram depicting a head mount display of an embodiment of the present invention.

FIG. 1 shows a schematic block diagram depicting a head mount display 1 in accordance with an embodiment of the present invention. The head mount display 1 includes a main body 2 and a monitor 4, and the main body 2 is connected to a input section 3. The main body 2 executes game programs and other programs recorded in ROM 12 according to input signals from the input section 3 and generates computer graphic images. A player positions a goggle-shaped monitor 4 before their eyes, operates the input section 3 while watching a screen drawn by computer graphics, and progresses the game by moving characters in the game.

Input signals which the player inputs to the input section 3 are sent to an input/output section 11 through a signal line 20. The input/output section 11 is connected to a CPU 10 by way of a common bus 19. ROM 12 where game programs including a program for determining an attention target object in the present invention has been stored is also connected to the common bus 19. The CPU 10 controls the movement of objects in the game, and calculates the movement of the objects in three-dimensional space and a view point position when images are displayed on the left and right screens respectively. Then the CPU 10 generates image data for left eye and right eye to display the two computer graphic screens cooperatively, and sends the left and right image data to a drawing circuit 15 for the left eye and a drawing circuit 17 for the right eye by way of the common bus 19 and the input/output section 14. Images generated by the drawing circuit 15 for the left eye and the drawing circuit 17 for the right eye are recorded to frame buffers 16 and 18 at the left and right, as image signals for one screen. The image signals recorded in the frame buffers 16 and 18 are output to the monitor 4 by signal lines 21 and 22, and are displayed on a liquid crystal monitor 23 for the left eye and a liquid crystal monitor 24 for the right eye.

[Changing Line of Sight Directions]

In the embodiment of the present invention, an object which a human being will pay attention to is forecasted when computer graphic images are generated for the head mount display, then the line of sight directions are dynamically changed to the direction of the forecasted object, and perspective conversion for the two-dimensional display screens is performed so as to generate more realistic and natural stereoscopic images. When a human being looks at an object, normally the individual not only focuses on the object but also changes the lines of sight to be cross-eyed if the object is near the view point. If the line of sight directions of both eyes are fixed to a point at infinity (left and right in parallel), which is the conventional method, and computer graphic images are generated for the head mount display, the stereoscopic images will be looked at quite differently from the natural perception of human beings when he/she watches an object near the view point.

In a prior art shown in FIG. 6, the line of sight 31 of the left eye and the line of sight 33 of the right eye are in parallel because they are directed to a point at infinity. Fixing the line of sight directions of both eyes to a point at infinity poses no problems when looking at an object at infinity, but it does create an unnatural feeling for human perception or a sense of incongruity when looking at an object that is close by, such as object B35. Therefore, according to the embodiment, an object to which left and right human eyes will pay attention to is forecasted and lines of sight in computer graphics are modified to be matched with the natural movement of lines of sight of a human being. Then natural three-dimensional images matching human perception can be generated and displayed.

[Forecasting an Attention Target Object]

The rules of forecasting an object on a screen that a human being will pay attention to are as follows.

(1) An object that is close by receives a higher degree of attention than an object that is farther away.
(2) A moving object receives a higher degree of attention than an object that is stopping.
(3) An approaching object receives a higher degree of attention than an object that is moving away.
(4) An object at the center of the screen receives a higher degree of attention than an object at the edge of the screen.
(5) An object that just appeared on the screen receives a higher degree of attention than an object that has been on the screen.
(6) A large object receives a higher degree of attention than a small object.
(7) An object with an outstanding hue receives a higher degree of attention than an object with a subdued hue (this, however, may be opposite depending on the contrast).
(8) A dangerous object receives a higher degree of attention than a safe object.

Based on the above forecasting rules, the object that a player will pay attention to is forecasted. Since (6) to (8) of the above rules are design factors, several levels of weighed values are assigned to each object in advance as attention degree data. In the case of (6), for example, when birds appear as objects, value 1 is assigned to a large bird as attention degree data, and value 0.5 is assigned to a small bird as attention degree data in advance. In the case of 7, for example, value 0.8 is assigned to a red object as attention degree data, and value 0.6 is assigned to a blue object as attention degree data.

(1) to (5) of the above rules, on the other hand, are factors that concern the position and movement of objects, so the weight of attention degree is calculated from such factors as the position and speed of objects, and the positional relationship among objects during the execution of a game. In the case of (1), for example, the weight is changed such that the attention degree data of a nearby object is greater than a far away object according to value z that indicates depth on the display screen. In the case of (2), for example, the weight is changed such that attention degree data of a moving object, such as a ball in a soccer game, is greater according to the velocity vector. Also, in the case of (3), for example, greater attention degree data is assigned to an approaching car than to a car that is moving away according to the direction of the velocity vector. In the case of (4), greater attention degree data is assigned to an airplane at the center of the screen than to an airplane at the edge of the screen according to the X and Y coordinates within the display screen, and in the case of (5), greater attention degree is assigned to a new enemy that appears on the screen than to an enemy which has been on the screen by comparison with objects in the previous frame.

Then an object to receive the highest degree of attention out of a plurality of objects is forecasted by comprehensive calculation which is described later. As a consequence, an object that a human being will pay attention to can be rationally estimated by selecting an object on the screen by such factors.

[Data Structure of an Object]

Figure 2:
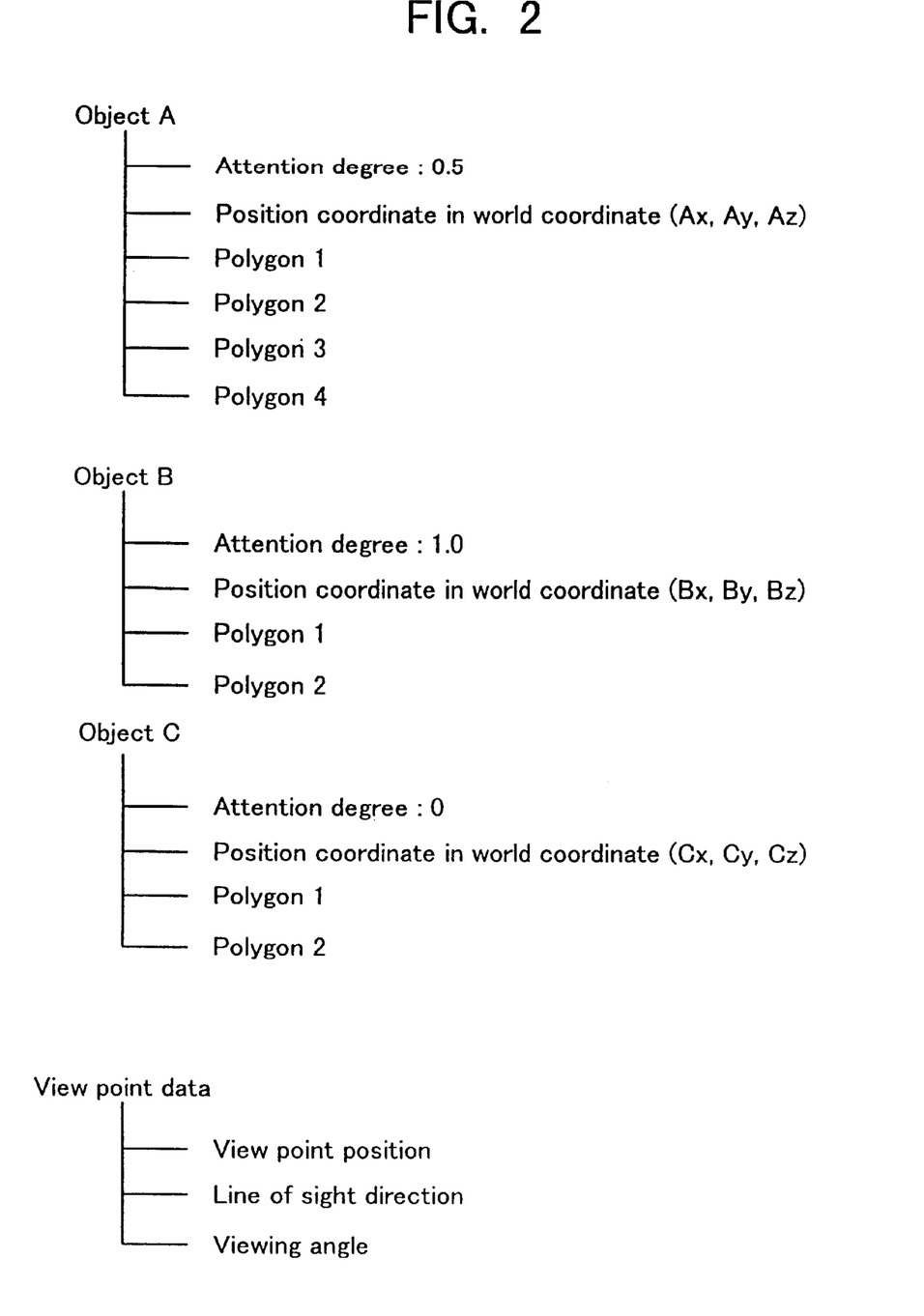
FIG. 2 is a data structure of an object in accordance with an embodiment of the present invention.

FIG. 2 shows an explanatory diagram of the data structure of objects in accordance with the embodiment of the present invention. The attribute data of an object is composed of the attention degree, position coordinate in the world coordinate, and polygon data of the object. The view point data includes the view point position, line of sight directions, and viewing angle (perspective). In the data of object A, for example, the attention degree data is 0.5, position coordinate in the world coordinate is (Ax, Ay, Az) and polygon data is polygon 1 to 4. The attention degree data is assigned to each object in advance, as value 0 to 1 for example, where attention degree data 1 is an object which receives the most attention, and attention degree data 0 is an object which receives the least attention.

Polygon data includes the three-dimensional coordinate of a vertex, and color data for example. The three-dimensional coordinate of a vertex is, for example, a coordinate indicating a relative position of the object from the origin of the object coordinate. The position coordinate, viewpoint data, and other data of the object are acquired by executing a game program stored in a memory (ROM 12) according to the control input data.

[Determining an Attention Target Object]

In the next process, an object that a human being will pay most attention to, that is, an attention target object, is determined from a plurality of objects by the comprehensive calculation based on the above object data. Then the line of sight direction of the view point data is modified to the attention target object. This modified view point data and object data are input to the above described left and right drawing circuits 15 and 17, then in the drawing circuits 15 and 17 geometric conversion for determining a position coordinate of a polygon in the world coordinate space, perspective conversion according to the view point data, rendering processing for generating the color data of the polygon, and other processings are executed and image data in the frame is recorded to the frame buffers 16 and 18. According to the image data, left and right images are displayed on the head mount display.

An example of a method for determining an attention target object is now described.

(1) At first, the distance between each object and the view point (value Z in coordinate axis Z direction in FIG. 3) is determined. For example, there are objects A, B and C on the screen in FIG. 3, so the distance between each object and the view point is calculated. Since each object is moving in the game, the distance between each object and the view point constantly changes.

(2) The moving speed of each object and whether the object is approaching the view point is determined. This is because an object moving at a faster speed normally receives a higher degree of attention, and the attention degree differs depending on whether the object is approaching the view point or is moving away from the view point, even if the moving speed is the same.

(3) The attention target object is determined by the value Z, the attention degree data and the moving speed of each object. For example, the comprehensive attention degree for each object is calculated as comprehensive attention degree=(1/Z)*(attention degree data)*(moving speed)

and the object with the greatest value is determined as the attention target object.

Figure 3:
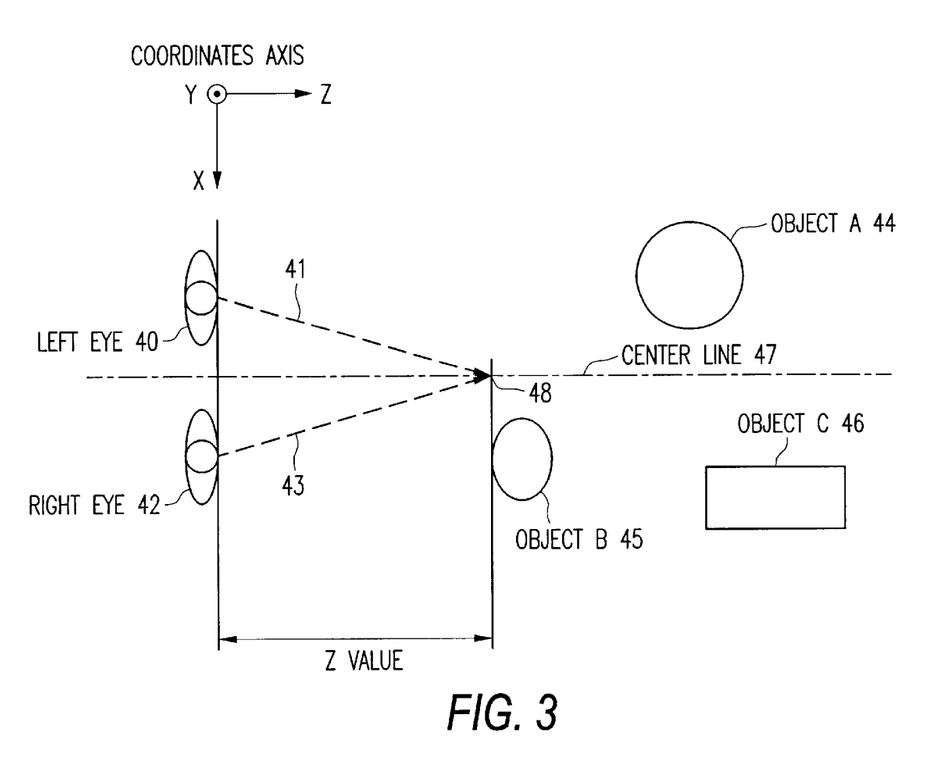
FIG. 3 is a schematic diagram depicting the case when a line of sight is directed to an attention target object in accordance with an embodiment of the present invention.

(4) The lines of sight for both eyes are directed to a point corresponding to the value Z of the attention target object on the center line between the left and right eyes, and the computer graphic images are created by the above described method in the drawing circuits 15 and 17. FIG. 3 is the case when the object B45 was determined as an object that receives the highest degree of attention as the result of the above calculation. Therefore the line of sight 41 of the left eye and the line of sight 43 of the right eye are directed to the point 48 corresponding to the value Z of the object B45 on the center line 47. Then computer graphic images are created based on these line of sight directions, and are displayed on the head mount display. The line of sight directions may be modified to the direction to the attention target object B45 itself.

In the above case, (1) distance (value Z) and (2) moving speed of the forecasting rules were considered, but the comprehensive attention degree can be determined additionally considering (3) moving direction, (4) position on the screen and (5) time when the object appeared on the screen. For example, when (3) moving direction is considered, the velocity vector of the object is used, and when (4) position on the screen is considered, X and Y coordinates of the object within the display screen are used, and when (5) time when the object appeared on the screen is considered, the history of the object for each frame of the display screen is used, to modify the attention degree data by the above formula for determining the comprehensive attention degree.

[Image Processing Flow Chart]

Figure 4:
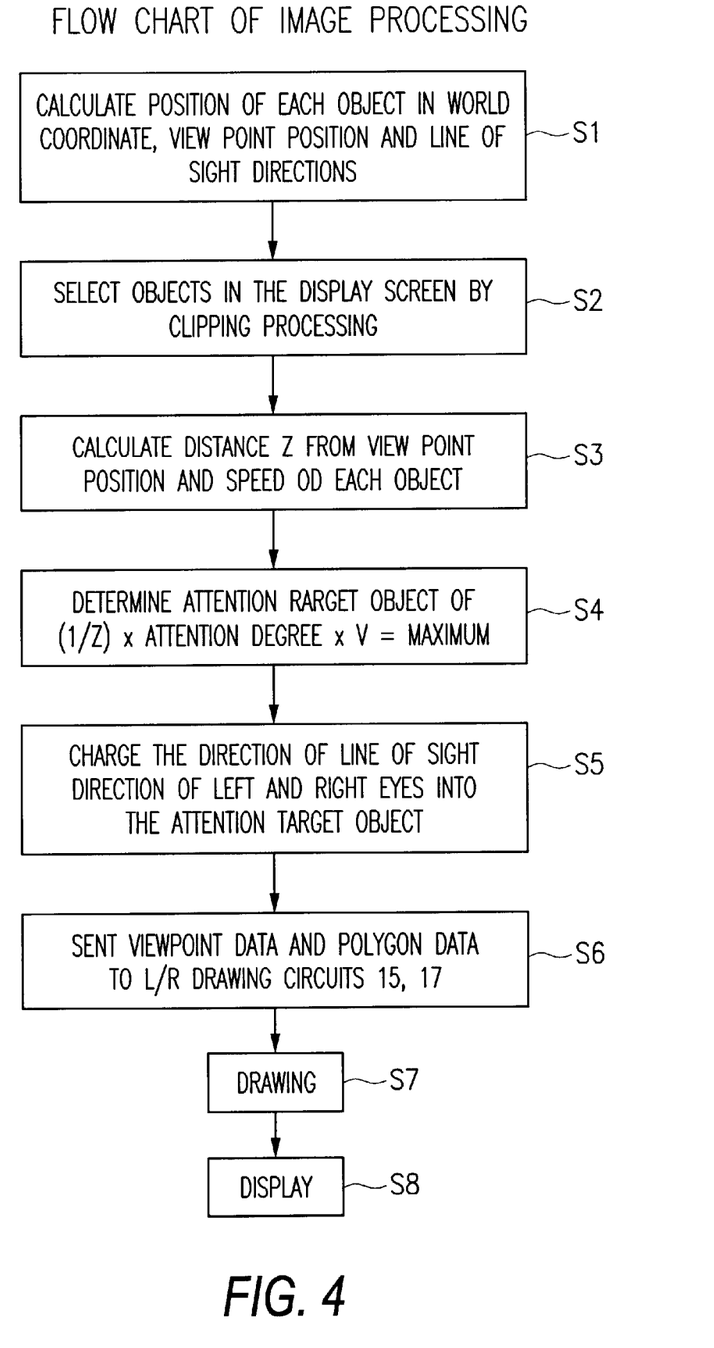
FIG. 4 is a flow chart of image processing in accordance with an embodiment of the present invention.

FIG. 4 shows a flow chart of image processings in accordance with the embodiment of the present invention. In each step S1~S6 in FIG. 4, the respective function is implemented by the computer of the main body 2 which executes the computer program stored in the ROM 12, a recording medium.

In step S1, a game program in the ROM 12 is executed by the CPU 10 according to the control input from the controller 3 by the player, and each object is moved, then the position of each object in world coordinate is computed. At the same time, the view point data including the virtual view point position and line of sight directions of the player is also computed. As a result, the object data shown in FIG. 2 is generated.

In step S2, clipping processing is executed and objects which enter the display screen determined from the view point data are selected. For the objects selected here, the above mentioned attention degree computation is executed in steps S3 and S4 and the attention target object is determined.

In step S3, data to be required for determining the attention target object is determined by calculation. The attention degree data has been assigned to each object, but data according to position and movement of each object is calculated in this step. In this flow chart, for example, the distance Z from the view point to each object in the Z axis direction and the moving speed v of each object are calculated.

In step S4, the attention target object is determined based on the above calculation result. This means that the attention target object is determined by computation according to the above rules for forecasting an attention target object. For example, the product of an inverse number of the distance L from the view point to each object, the attention degree data of each object, and moving speed v of each object is calculated, and the object where the product is greatest is determined as the attention target object.

In step S5, the line of sight directions of the left and right eyes are compensated for so as to be directed to the attention target object determined in step S4. By this compensation, the line of sight directions in computer graphic processing can be determined by forecasting the movement of the left and right eyes of a human being, which implements natural stereoscopic computer graphic representation suitable for human perception.

In step S6, the view point data including the view point position and the line of sight directions to the attention target object determined in the above step are sent to the left and right drawing circuits 15 and 17 along with the polygon data of each object. That is, the object data shown in FIG. 2 and the modified view point data are sent to the drawing circuits 15 and 17 as drawing information.

In step S7, the above described computer graphic drawing is executed in the left and right drawing circuits 15 and 17 in an ordinary way. Since perspective conversion processing is executed according to the modified line of sight direction here, left and right images matching with the movement of the lines of sight of the player can be generated, and in step S8, computer graphic images are displayed on the monitor 4 of the head mount display. The abovementioned steps S1–S8 are executed for every frame so that the line of sight direction is dynamically changed.

In the above embodiment, the head mount display is employed as the stereoscopic display device. However, the present invention is applicable to another stereoscopic display device. For instances, an stereoscopic display device, in which an image for right eye and an image for left eye are alternately displayed in a single display frame by frame, and right and left shutters provided between the display and right and left eyes are closed or opened alternately in sync. with the images. The shutter is normally eye glass type device which human being wears on his or her face. This display is disclosed in Japanese Issued Patent No. TOKKOUHEI 6-59108 (or Japanese Laid open patent No. 62-239784).

Figure 5:
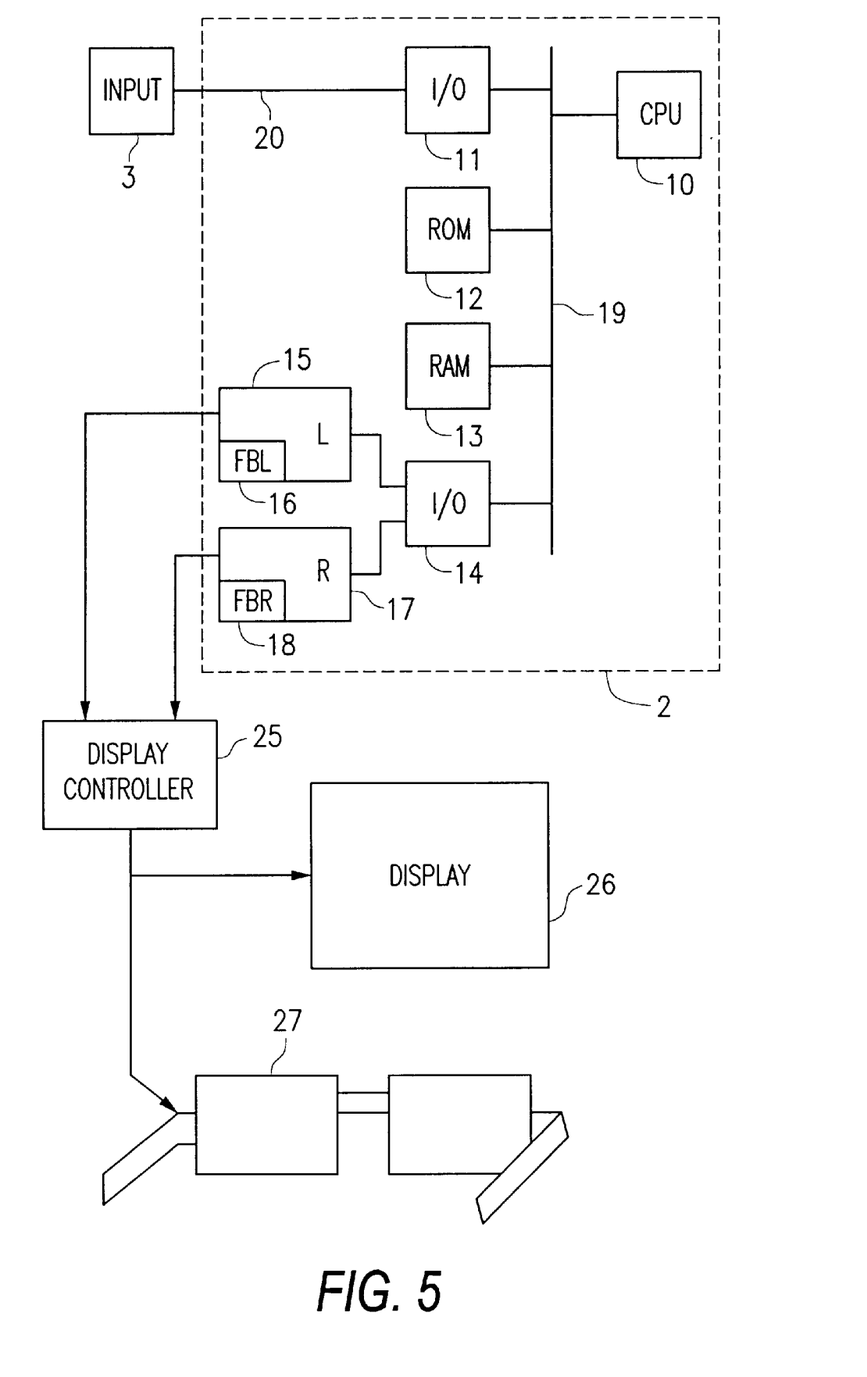

FIG. 5 shows a block diagram of the above stereoscopic display device. In FIG. 5, the same reference number is given to the corresponding element in FIG. 1. The body 1 for generating images for right and left is the same as shown in FIG. 1. Only difference is that the stereoscopic display device of FIG. 5 has a display controller 25 for combining images for right and left which are read out from the frame buffers 16 and 17. The display controller 25 controls to provide the images to a single display 26 so that an image for right eye and an image for left eye are alternately displayed in the display 26 frame by frame. Further, the display controller 25 provides a synchronous signal to the eye glass type shutter element 27 which open or close alternately in sync. with the display.

Further, there has been proposed a stereoscopic display device which includes a lenticular lens or parallax barrier between the display and human beings so that human beings do not necessary to wear any eye glasses or head mount display. In the display, the image for right eye and the image for left eye are displayed in plural strip areas in the display screen alternately. And the lenticular lens or parallax barrier provide such images for right and left to right eyes and left eyes of plural human beings respectively. This type stereoscopic display device can also employ the present invention. This stereoscopic display device is disclosed in Japanese laid open patent No. 7-104212.

As described above, the present invention allows realistic and natural stereoscopic images with changing the line of sight directions dynamically by forecasting images that a human being will pay attention to during the generation of computer graphic images for the stereoscopic display device.

What is claimed is:

1. A display device including a display screen which displays images for right and left eyes, said display device comprising:

a drawing circuit which generates image data for said right and left eyes by perspective conversion processing according to object data to be displayed and to view point data including view point position and line of sight directions; and an image processing unit which determines an attention target object from said plurality of objects to be displayed according to the distance from said view point position to said object position, modifies the line of sight directions separately for images for said right and left eyes according to the distance from said view point to the target object, and provides said view point data including the modified line of sight directions and object data to the drawing circuit.

2. The display device according to claim 1, wherein:

said object data includes a three-dimensional position coordinate in three-dimensional coordinate space and preassigned attention degree data, and said image processing unit determines said attention target object based on said distance determined by said three-dimensional position coordinate and said attention degree data.

3. The display device according to claim 2, wherein:

said image processing unit uses at least one of velocity data when the object is moving to the view point position, position data in said display screen of the object, and history data when the object positioned in said display screen for determining said attention target object.

4. The display device according to claim 1, 2 or 3, wherein:

the display screen is provided in a head mount type display for right and left eyes and each display screen is provided in front of the right and left eyes.

5. The display device according to claim 1, 2 or 3, wherein:

the images for right and left eyes are alternately displayed in the display screen frame by frame.

6. The display device according to claim 1, 2 or 3, wherein:

the images for right and left eyes are displayed in the display screen in plural stripe areas alternately.

7. A computer-readable recording medium recording a program for generating a view point data and an object data, for a stereoscopic display device including: a display screen which displays images for right and left eyes, and a drawing circuit that generates image data for said right and left eyes by perspective conversion processing according to the view point data including a view point position and line of sight directions separately, and the object data to be displayed, said program executing image processing procedure of:

determining an attention target object from said plurality of objects to be displayed according to the distance from said view point position to said object position, modifying the line of sight directions for said images for left and right eyes according to said distance, and inputting said view point data and the object data to the drawing circuit.

8. The computer-readable recording medium according to claim 7, wherein said object data includes a three-dimensional position coordinate in a three-dimensional coordinate space and preassigned attention degree data, and said image processing procedure further includes determining said attention target object based on said distance determined from said three-dimensional position coordinate and said attention degree data.

9. The computer-readable recording medium according to claim 7, wherein in said image processing procedure, at least one of velocity data when the object is moving to the view point position, position data in said display screen of the object, and history data when the object positioned in said display screen is used for determining said attention target object.

* * * * *